United States Patent
Boa et al.

(10) Patent No.: US 6,480,858 B1
(45) Date of Patent: Nov. 12, 2002

(54) METHOD AND APPARATUS FOR FINDING NEAREST LOGICAL RECORD IN A HASH TABLE

(75) Inventors: Douglas S. Boa; Simon M. Meacham, both of Redmond; Barry M. Nolte, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/345,176

(22) Filed: Jun. 30, 1999

(51) Int. Cl.[7] .............................................. G06F 17/00
(52) U.S. Cl. ................................ 707/101; 707/7; 707/8
(58) Field of Search ............... 707/1–206; 709/201–218

(56) References Cited

U.S. PATENT DOCUMENTS

| | | |
|---|---|---|
| 6,256,622 B1 * 7/2001 | Howard, Jr. et al. | 707/3 |
| 6,272,486 B1 * 8/2001 | Garth et al. | 707/2 |
| 6,289,337 B1 * 9/2001 | Davies et al. | 707/3 |

OTHER PUBLICATIONS

Alter, "A model for automating file and program design in business application systems", Jun., 1979, Communications of the ACM, vol. 22, Issue 6.*

Robinson, "Order preserving linear hashing using dynamic key statistics", Jun., 1985, Proceedings of the fifth ACM SIGACT–SIGMOD symposium on Principles of database systems.*

Wuytack et al., "Transforming set data types to power optimal data structures", Apr., 1995, Proceedings 1995 international symposium on Low power design.*

* cited by examiner

Primary Examiner—David Jung
(74) Attorney, Agent, or Firm—Mark R. Hennings; Merchant & Gould (57) ABSTRACT

A method, apparatus, software and data structure is disclosed for more efficient access times for linear operations in a hash table, including finding the nearest logical record. A plurality of actual data records and a plurality of marker data records are inserted in a hash table using a hash function. The actual data records and marker data records have a logical ordering specified by a key and are threaded into the hash table to allow linear access by walking the hash table. The logical ordering of the actual data records and marker records is lost upon entry into the hash table, and the keys of the marker data records are distributed at known positions throughout the range of the keys of the actual data records. If when hashing a given key no record exists in the database for the given key, one of the keys for the marker data records are hashed to locate the associated marker data record in the hash table. A nearest logical record may thus be retrieved entering the hash table through the marker data record.

9 Claims, 6 Drawing Sheets

METHOD AND APPARATUS FOR FINDING NEAREST LOGICAL RECORD IN A HASH TABLE

REFERENCE TO RELATED APPLICATIONS

This application is related to a co-pending application having Method and Apparatus for Marking a Hash Table and Using the Marking for Determining the Distribution of Records and for Tuning application Ser. No. 09/343,625 which is assigned to the same assignee as the present application, filed on the same day herewith and hereby incorporated by reference.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©1999, Microsoft, Inc.

1. Technical Field of the Invention

The present invention pertains generally to data access with hash tables, and more particularly to a system for improving access to nearest logical records in logically ordered data contained in a non-logically ordered hash table.

2. Background of the Invention

Traditional linear hash tables optimize access time by evenly distributing records across the underlying table. In the process of entering records into the hash table, any logical ordering of the data is lost. While access time for a specific record given a specific key is fast, the ability to "walk" to adjacent logically ordered (not physically ordered in the hash table) is lost. Further, in the absence of a record existing in the hash table for a given key, due to the logical ordering of the data being lost on entry into the hash table, it is impossible to perform a time optimal "find nearest", "find nearest preceding", or "find nearest proceeding" type of query.

Figure 1:
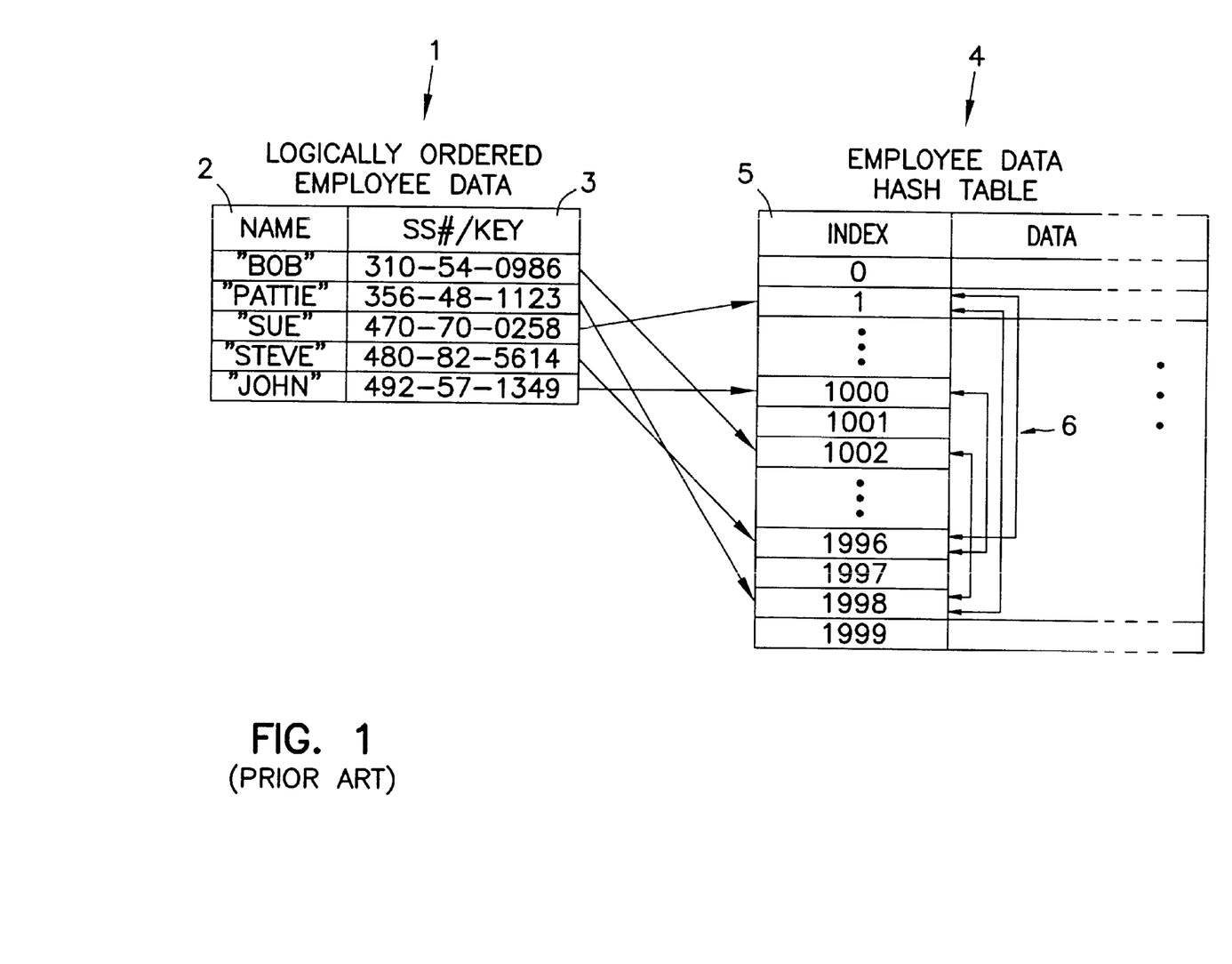
FIG. 1 illustrates a prior art hash table.

Referring now to FIG. 1, there is illustrated an example of the use of hashing to store and retrieve logically ordered data. In this example, employee records 1 include an employee name 2, and a social security number 3 used as key k for a hash function F(k) used to map employee records 1 to a hash table 4 with an Index 5 space of 2000 (0–1999). Records 1 are logically ordered according to social security number. As illustrated in FIG. 1, records 1 are mapped, in this example, with hash function F(k) (which may be any arbitrary function), as follows:

TABLE 1

| Social Security Number | Hash Table Index | Next Record Pointer | Previous Record Pointer |
| --- | --- | --- | --- |
| 310-54-0986 | 1002 | 1998 | N/A |
| 356-48-1123 | 1998 | 1 | 1002 |
| 470-70-0258 | 1 | 1996 | 1998 |
| 480-82-5614 | 1996 | 1000 | 1 |
| 492-57-1349 | 1000 | N/A | 1996 |

Figure 3A:
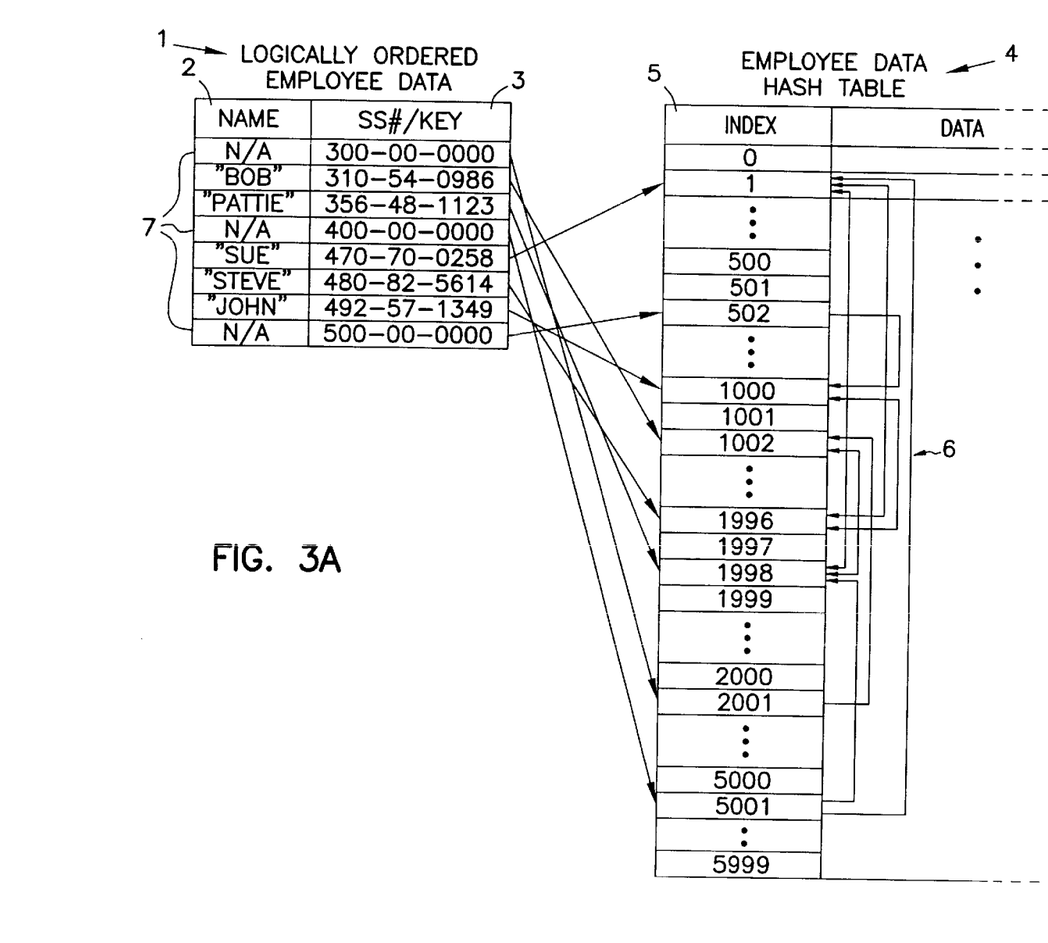
FIGS. 3A and 3B illustrate example embodiments of the invention.
Figure 3B:
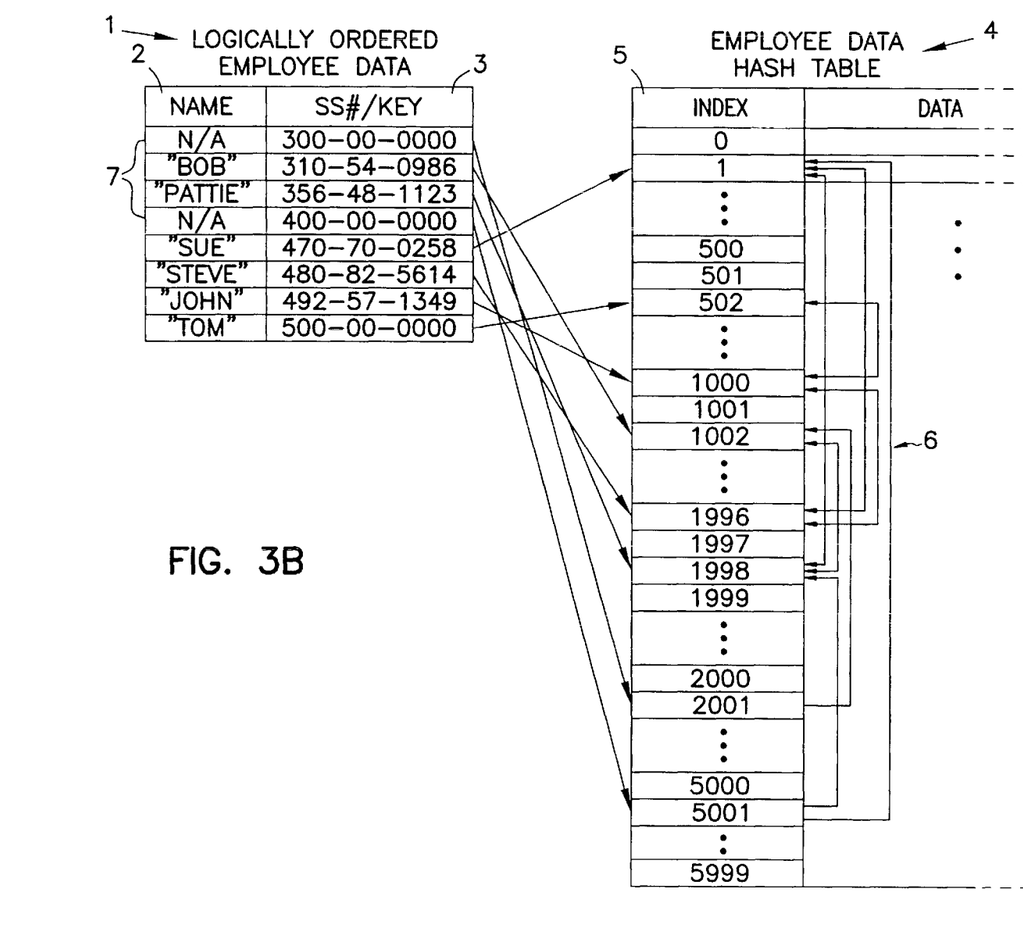

As further illustrated in FIG. 1 and Table 1 above, each record in the hash table is threaded by the inclusion of pointers 6 to the next succeeding and next preceding logically ordered record. In FIGS. 1 and 3, pointers with arrows on both ends represent both the "next" and "previous" record pointers between records. With this threading, it is possible to "walk" to adjacent logically ordered records by following pointers 6.

While the threaded linear hashing table example described above provides for optimized access time by allowing records to be located with a single hashing operation, and also provides the ability to walk the records in the table in logical order using pointers, a problem still remains in locating a record logically nearest a particular key where there is no record in the hash table corresponding to the key. For example, if one were to attempt to locate the nearest preceding logical record with the key 474-56-0789, the hashing function may point to a record in the hash table with the Index 1854. In the example of FIG. 1, no record exists at this Index, and thus it is not possible to enter the hash table at the index and walk to the nearest preceding record. Thus, this record may only be found by walking through the entire table, beginning with the first record (which, assuming that the table contains thousands or hundreds of thousands of records is likely very inefficient), or hashing each of the possible keys on the preceding record side of the key 474-56-0789, until a hashing operation locates a record. In this example, such a search would require hashing all of the keys in the range between 474-56-0789 and 470-70-2358. Again, this is an inefficient manner in which to locate the nearest logical record. Accordingly, there is a need for a more efficient system for locating a nearest logical record in a hash table where no record exists for the designated key.

SUMMARY OF THE INVENTION

According to various example embodiments of the invention, there is provided an efficient system for performing sequential linear access and other operations on logically ordered data stored in non-logical order in a hash table, as described herein below. In particular, the invention provides, among other things, that marker data records with known keys are inserted in the hash table together with the actual data records threaded in the hash table, wherein the marker records are used to obtain an initial position in the hash table data records.

By selecting a logically closest marker record, a valid entry into the hash table is provided, which should be near a desired record. Where it is desired to find a record which is nearest to a record which may not exist, using the marker closest to such record provides a known valid entry point into the hash table. A reasonably short walk through records in the hash table is then performed to locate a nearest logical record.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 2:
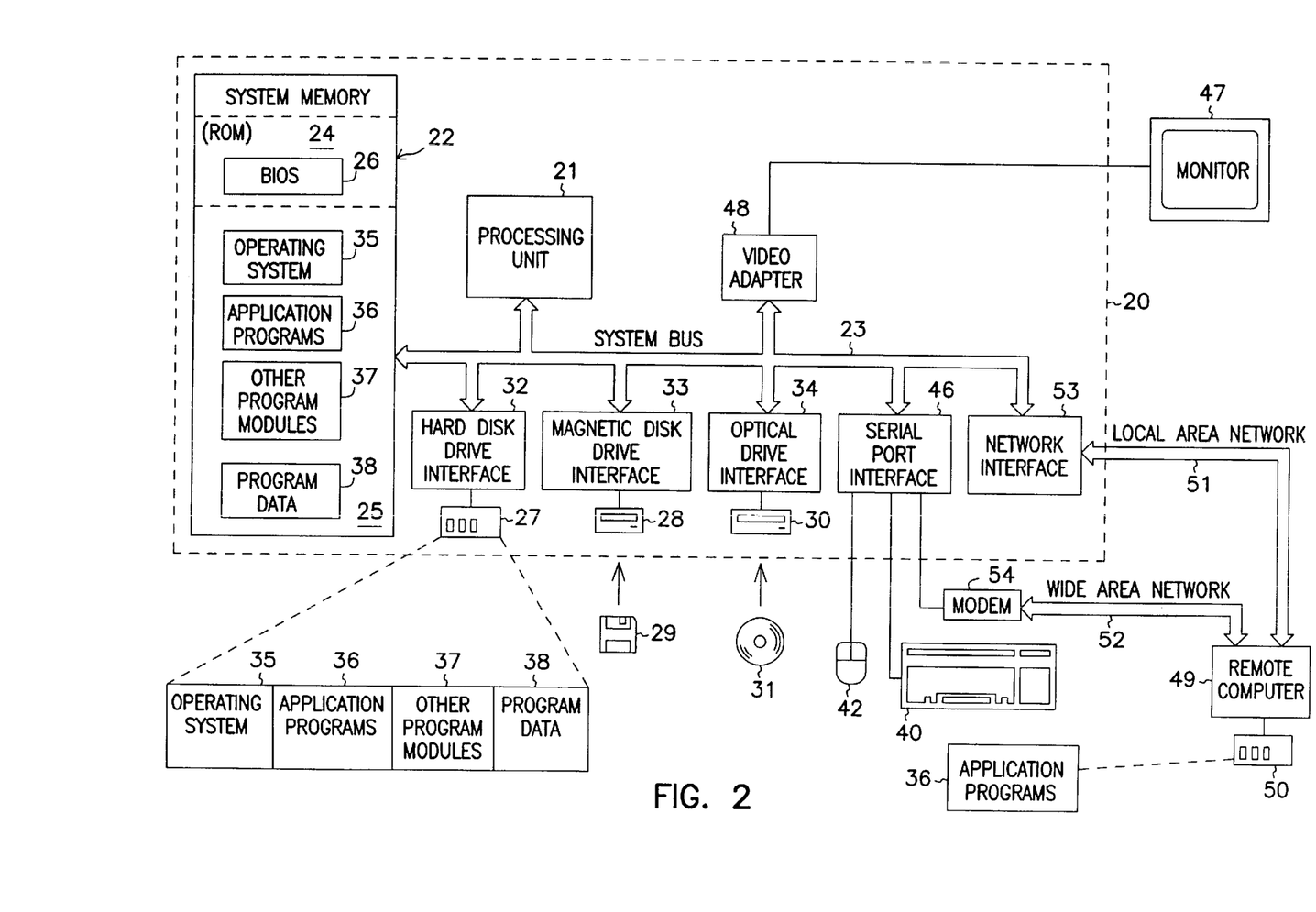
FIG. 2 illustrates a simplified overview of an example embodiment of a computing environment for the present invention.

Referring to FIG. 2, a diagram of the hardware and operating environment in conjunction with which embodiments of the invention may be practiced is shown. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 2 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communications device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

EXAMPLE EMBODIMENTS OF THE INVENTION

Referring now to FIG. 3A and Table 2, there is illustrated an example embodiment of the invention demonstrating the use of marking records in a hash table in order to provide a more efficient system for locating a nearest logical record in a hash table where no record exists for the designated key. In the example embodiment of FIG. 3A, "marker" records 7 have been added to the hash table of FIG. 1 (in which the index space is expanded to 0–5999). As will be explained further below, marker records 7 are disposed at known locations in the hash table, and provide a known point of entry in the case where no actual record exists for a specified key in an attempt to locate a record in the table.

In the example of FIG. 3A, marker records 7 have been added for keys 300-00-000, 400-00-000 and 500-00-000. The hash function F(k), in this example, has mapped these marker records to the hash table indexes indicated below:

TABLE 2

| Social Security Number | Hash Table Index | Marker Record (Y/N) | Next Record Pointer | Previous Record Pointer |
|---|---|---|---|---|
| 300-00-0000 | 2001 | Y | 1002 | N/A |
| 310-54-0986 | 1002 | N | 1998 | N/A |
| 356-48-1123 | 1998 | N | 1 | 1002 |
| 400-00-0000 | 5001 | Y | 1 | 1998 |
| 470-70-0258 | 1 | N | 1996 | 1998 |
| 480-82-5614 | 1996 | N | 1000 | 1 |
| 492-57-1349 | 1000 | N | N/A | 1996 |
| 500-00-0000 | 502 | Y | N/A | 1000 |

As further illustrated in FIG. 3A, the hash table includes an indicator or flag specifying the marker records, so that they can be distinguished from records containing actual data. Further, it is noted that the marker records are transparent to the next and previous record pointers for actual records. In other words, according to one example embodiment, actual records in the hash table do not contain any pointers to the marker records. On the other hand, marker records do include pointers to the actual records preceding and following them. In an alternate embodiment, actual records may include pointers to marker records, and such marker records may be disregarded when walking the hash table to locate preceding and proceeding actual records.

Returning to the example set forth in the Background of the Invention, the use of the marker records will be explained by example. Consider again an attempt to locate the nearest preceding logical record to the record with the designated key 474-56-0789, wherein the hashing function points to a nonexistent record in the hash table with the index 1854. Unlike the example of FIG. 1, however, the present invention provides a means to enter the hash table at a location that is relatively close to the desired record, as opposed to walking the table from the beginning or hashing every preceding key until the desired record is located. Namely, according to this example embodiment of the invention, a marker record function M(k) is provided, and, in the event that the hashing function F(k) fails to hash to an actual record, M(k) is used to locate a marker record that is logically near the sought after nearest preceding record. For example, in this instance the function M(k) may identify the marker record with the key 500-00-0000. The hash table can then be entered at this point, and walked to the preceding record with the key 480-82-5614. This key is then compared against the designated key, to determine if the record precedes the designated key. Since it does not, the table is walked one more record back to the record with key 470-70-0258, which is then identified as the nearest preceding logical record. This system of locating the nearest logical record when hashing to the designated key fails thus provides for increasing the efficiency of locating records in a hash table.

While the example of FIG. 3A illustrates a periodic distribution of marker records in the hash table, the invention is not limited in this respect. In another example embodiment, for instance, the marker records may be distributed throughout the hash table according to any other simple or complex function providing a greater number of marker records in certain segments of the database, for example those with a higher density of actual records, and a lesser number of marker records in other segments of the database with a lower density of actual records. Alternatively, a marker record may be inserted every x number of actual data records, such as every 10 records, or every 100 records. The function may comprise a mathematical computation, or provide a look up table with a plurality of ranges of keys each pointing to a corresponding marker record. According to yet another embodiment, one or more different functions may be used to distribute marker records in the same hash table.

Figure 4:
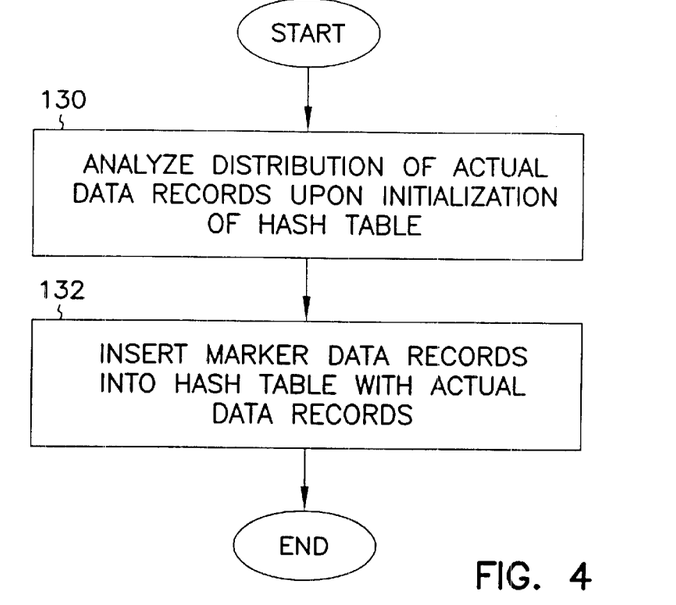
FIG. 4 illustrates an example embodiment of a hash table according to the present invention.
Figure 5:
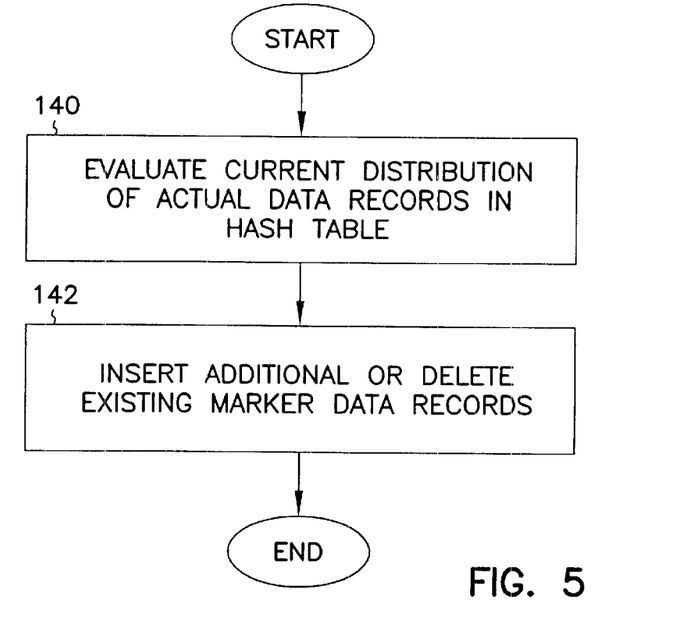
FIGS. 5 and 6 illustrate example embodiments of the operation of data storage systems according the present invention.

According to yet another example embodiment of the invention, marker records may be added to the hash table upon initialization of the table and remain constant, or be added to or deleted from the hash table as the actual records in the hash table change over time. Tuning of the marker interval frequency in the ordered data can increase access times for linear operations at the expense of hash table size. For instance, according to one example embodiment illustrated in FIG. 4, the distribution of actual records in the hash table is evaluated at the time the hash table is initiated and loaded with records (130), and marker records are distributed throughout the data based on the distribution of actual records (132). According to another example embodiment illustrated in FIG. 5, the distribution of actual records in the hash table is evaluated from time to time (140), and additional marker records added or deleted based on changes in the distribution (142). Record distribution may be analyzed by any means, for example by analysis of the database statistics that may be generated by database software or as taught in the previously incorporated co-pending application Ser. No. 09/343,625.

Furthermore, according to one example embodiment of the invention, if an actual record exists at a location identified for placement of a marker record, the marker record is not placed at such location. In this situation, the marker record function M(k) will point to the actual record instead of what would otherwise be a marker record. Furthermore, should an actual record be added to the hash table at the location of a marker record, the actual record will be written over the marker record. Similarly, if an actual record at a location designated for a marker record is deleted, a marker record will be added to the hash table to replace the deleted record. FIG. 3B illustrates an example of an actual record at the location of the marker record for the social security number 500-00-0000.

Figure 6:
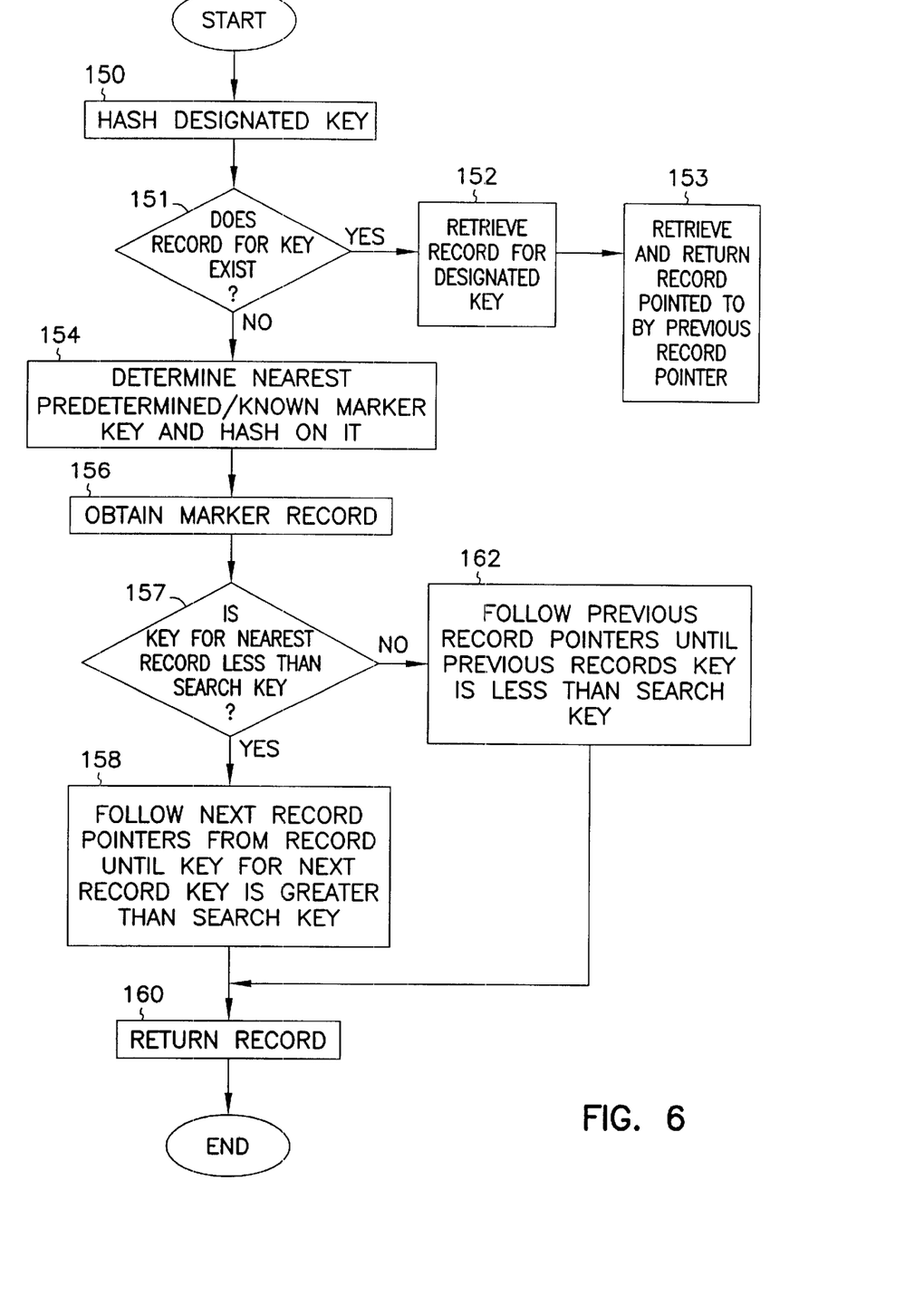

Referring now to FIG. 6, there is illustrated an example embodiment of the use of marker records in a hash table to find a record corresponding to the nearest preceding key. First, a designated key is hashed (150). If a record exists for the key (151), it is retrieved (152), and the record pointed to by this record's previous record pointer is returned (153). If no record exists for the key, the hash is performed on the nearest regular pre-determined marker key to the initial key, as may be determined by a marker function M(k) (154). This marker record is then obtained (156). If the key for the nearest record (157) is less than the search key, the next record pointers are followed from that record until the key for the current record is greater than the search key (158). The record pointed to by this record's previous record pointer is then returned (160). If the key for the nearest record is greater than the search key the previous record pointers from that record are followed until the key for the current record is less than the search key (162). The record pointed to by this next record pointer is then returned (160). Of course, it is readily appreciated that the operations of FIG. 6 are readily extended to other operations such as, but not limited to, locating a record having the nearest proceeding key. It is noted that the above described embodiments refer to the hash table records by an index, and that such index may map directly to a memory or storage location, or may be indirectly mapped to such locations, or mapped in any suitable manner, or further that such index may comprise an address for a location. In other words, the invention is in no way limited in this respect.

Thus, the present invention provides for inserting marker records at predetermined intervals when no actual record in the ordered data exists for a given key. Thus, the invention guarantees finding records at known intervals in the hash table which can be used to orient a search in the ordered data should there be a need to perform some operation which requires sequential linear access operations such as getting a nearest preceding or proceeding record. This can greatly increase access speed for this type of query in a hash table.

Thus, while the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof. In addition, according to another embodiment, some or all of the marker records could be actual data records that are distributed proximate where a marker record may be desirable, with the marker function pointing to these actual data records instead of a marker data record that might have been added to the table.

What is claimed is:

1. A method in a computer system for locating a data record, comprising:

inserting a plurality of actual data records and a plurality of marker data records in a hash table using a hash function, wherein the actual data records and marker data records have a logical ordering specified by a key, the keys of the actual data records have a range, the actual data records and marker records are not logically ordered in the hash table, and the keys of the marker data records are distributed at known positions throughout the range of the keys of the actual data records; and hashing a given key, and if no record exists in the hash table for the given key, hashing one of the keys for the marker data records to locate the associated marker data record in the hash table.

2. A method according to claim 1 wherein one or more of the actual data records and one or more of the marker data records in the hash table include a pointer to a logically preceding and proceeding actual data record.

3. A method according to claim 2 further including following a pointer from the marker data record to an actual data record.

4. A method according to claim 3 including inserting one or more additional marker data records into the hash table in response to adding one or more additional actual records to hash table.

5. A method according to claim 1 wherein the known keys of the marker data records are identified using a marker record distribution function.

6. A method according to claim 5 wherein the distribution function is periodic.

7. A method according to claim 6 wherein the known keys are spaced at regular intervals.

8. A method according to claim 1 wherein the mark records are inserted so as to guarantee a record will be present for known keys in the hash table.

9. A computer readable medium having instructions stored there on for causing a computer to perform a method in a computer system for locating a data record, comprising:

inserting a plurality of actual data records and a plurality of marker data records in a hash table using a hash function, wherein the actual data records and marker data records have a logical ordering specified by a key, the keys of the actual data records have a range, the actual data records and marker records are not logically ordered in the hash table, and the keys of the marker data records are distributed at known positions throughout the range of the keys of the actual data records; and hashing a given key, and if no record exists in the hash table for the given key, hashing one of the keys for the marker data records to locate the associated marker data record in the hash table.

\* \* \* \* \*